Sept. 19, 1950        E. KLEIN        2,523,121
COMBINED BREAD AND CUTLERY CABINET
Filed Jan. 24, 1948
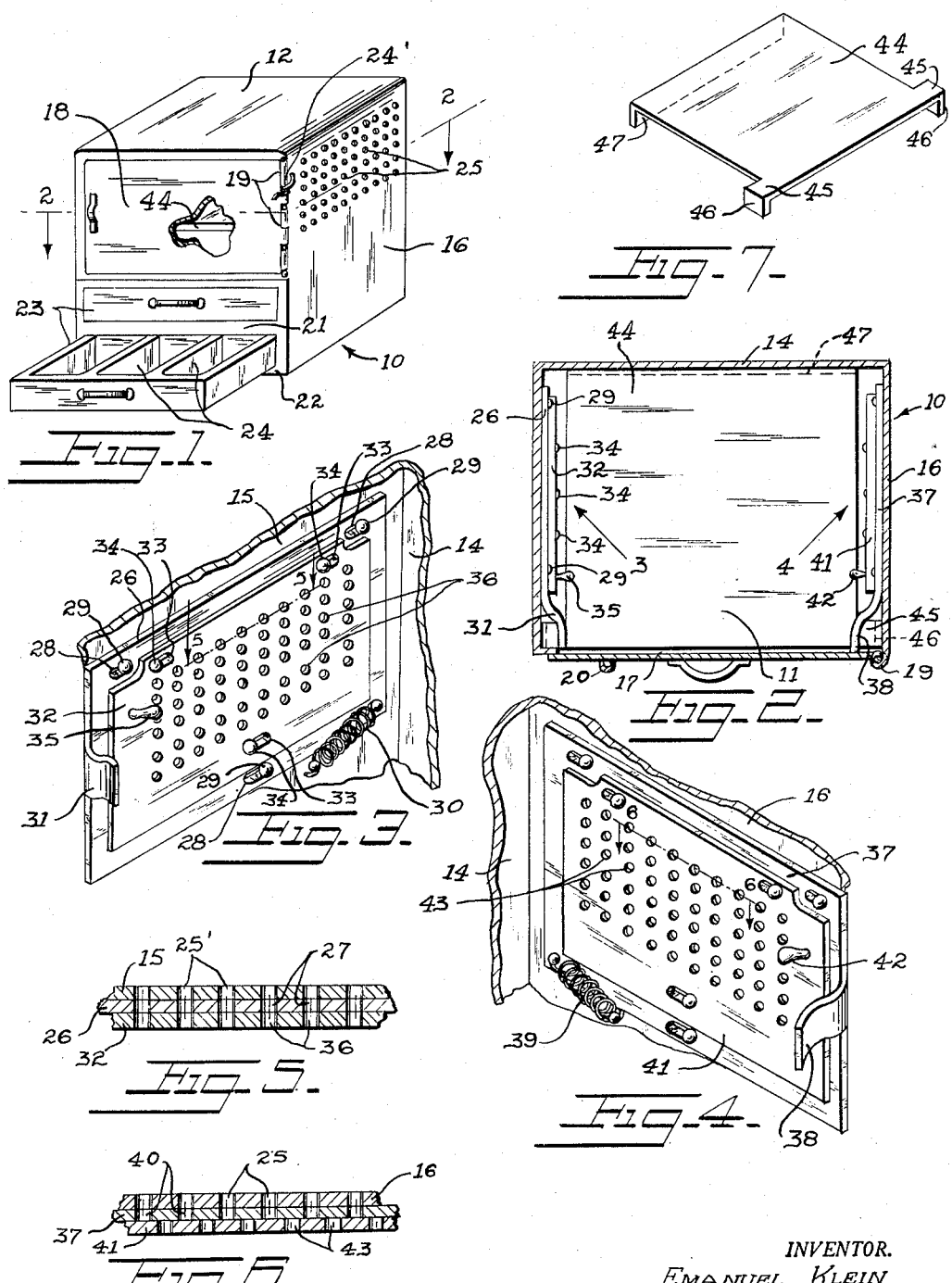
INVENTOR.
EMANUEL KLEIN
BY
ATTORNEY

UNITED STATES PATENT OFFICE 2,523,121

COMBINED BREAD AND CUTLERY CABINET

Emanuel Klein, Brooklyn, N. Y.

Application January 24, 1948, Serial No. 4,170

5 Claims. (Cl. 45—71)

This invention relates to new and useful improvements in household articles of the kind ordinarily used in the kitchen, and, more particularly, aims to provide a novel and valuable article constituting a combined bread box and cutlery cabinet.

As the invention is preferably carried out, a larger upper compartment of the cabinet, having a front door, serves as the bread box, and in the lower part of the cabinet are one or more slide drawers for cutlery or the like. Such drawer or drawers desirably are subdivided, as by one or more vertical partitions, into portions for storing pieces of cutlery or the like of different kinds.

The bread box, preferably provided with a shelf to subdivide the same into an upper and a lower bread holding chamber, is provided with ventilating means, for serving an important purpose. Bread and like baked products are subject to more rapid deterioration when confined in an air-tight space, than when exposed to air freely circulating; and the ventilating means provided eliminates this defect of the ordinary bread box.

A feature of the invention, also, is a ventilating means of simple, inexpensive yet dependable construction and operation, and at the same time, when desired, a ventilating means conveniently adjustable for varying its ventilating action to render said means operable in any one of various ways according to the humidity and other weather conditions prevailing at different times.

This ventilating means is thus adjustable, without affecting its ability to retain another feature of the invention, which latter feature is an automatic coaction between the door and the ventilating means whereby, when the door is opened, the ventilation means is closed, and also whereby, incidental to closing the door, the ventilation means is opened.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a perspective view showing an embodiment of the invention as now favored, with the door (partially broken away) shown closed, and with one of the cutlery drawers shown partially open.

Fig. 2 is a horizontal section, taken on the line 2—2 of Fig. 1.

Fig. 3 is a fragmentary perspective view, showing the automatic ventilating means at the inside of the bread box adjacent the side wall of the latter which is at the left in Fig. 2; these parts being viewed as per the arrow 3 of Fig. 2.

Fig. 4 is a view similar to Fig. 3 showing substantially identical ventilating means placed interiorly of the opposite side wall of the bread box; these parts being viewed as per the arrow 4 of Fig. 2.

Fig. 5 is an enlarged detail horizontal section, taken on the line 5—5 of Fig. 3, showing the parts of this ventilating means adjusted for being opened when the door is closed, and, the door being assumed to be closed, showing the ventilating means open.

Fig. 6 is an enlarged detail horizontal section, taken on the line 6—6 of Fig. 3, showing the parts of this ventilating means adjusted for remaining closed whether the door is open or closed.

Fig. 7 is a perspective view showing, detached, the shelf in the bread box.

Referring to the drawings more in detail, the embodiment of the invention illustrated is marked generally 10; the same including an upper larger compartment 11 for serving as a bread box, such box bounded by a roof wall 12 for the combined structure, by the upper portion of said structure's back wall 14, by the upper portions of said structure's two side walls 15 and 16, and by a horizontal partition wall 17. The front of the bread box is open, but closable by a swing door 18 hinged at 19 and having a handle 20.

Below the partition wall 17 is another horizontal partition wall 21, desirably halfway between the wall 17 and the structure's bottom wall 22, thereby providing recesses for housing a pair of outwardly slidable drawers 23. These drawers are provided for holding such articles as cutlery, and therefore they are advantageously subdivided by vertical partitions 24, see Fig. 1.

The hinge 19 may be a spring hinge, incorporating one or more springs such as the one shown at 24', to urge the door, preferably rather strongly, to closed position; or the door may be provided with any suitable form of latch, not shown, for holding the door closed.

Referring to the ventilating means, in the present case, this is shown at both sides of the bread box.

Each side wall of the bread box established by the upper portions of the walls 15 and 16 is provided with a plurality of perforations as shown at 25 in Fig. 1 in the case of the wall 16. The wall 15 is provided with a plurality of perforations, some of which are shown at 25' in Fig. 5 of like size, number and arrangement as the perforations 25.

Referring first to the wall 15, a slide plate 26 is mounted inside said wall for flatwisely engaging it over its perforated area and for having slight horizontal sliding movement thereover. The plate 26 carries a plurality of perforations 27, see Fig. 5, exactly like the perforations 25 in size, number and arrangement. The sliding movement of the plate 26 need be only that required to endwisely move the plate either to stagger its perforations relative to, or to fully register them with, the perforations 25' in the wall 15.

For this sliding movement the plate 26 is provided with three slots 28, each engaging the shank of a headed stud 29 suitably secured to the wall 15; with the heads of the studs arranged to hold the plate 26 flatwisely slidable against the wall 15 without undue play in a direction away from said wall.

The slots 28 are of such length that when the door 18 is opened, a light spring 30, attached at one end to the rear portion of the plate and at its other end to the wall 15, will move the plate toward the front of the bread box a sufficient distance to stagger the perforations 27 of the plate 26 relative to the perforations 25' of the wall 15, when the shanks of the studs 29 will engage the outer ends of the slots 28. As the parts are shown in Fig. 3, the door 18 is assumed to be closed; such closing of the door having caused it to engage a reduced curved extension 31 at the outer end of the plate 26, thereby to fully align said perforations 27 and 25' as shown in Fig. 5.

Thus, with the ventilating arrangement for the side of the bread box at the wall 15 as so far described, every time the door 18 opens this ventilating means will be closed, and every time the door is closed the said means will be opened, so that when ventilation is shut off by the closed door, this is compensated for by the opening of said means.

Humidity conditions, however, may be such that it may be desired for the time being to have the ventilating means closed, either wholly or variously partially, even when the door 18 is closed.

For taking care of this situation, there is slidably mounted on the plate 26 an auxiliary plate 32; the latter being provided with three slots 33 engaging the shanks of three headed studs 34 suitably secured to the plate 26, with the heads of these studs arranged to hold the plate 32 in such manner that when the said plate 32 by means of its handle 35 is given a slidably effected adjusting movement it will be frictionally held to remain in the adjusted position.

The auxiliary plate 32 is provided with a plurality of perforations 36 exactly like the perforations 25' and 27 as to size, number and arrangement. The handle 35 is used to adjust the plate 32 on the plate 26 to remove the perforations 36 from their full alignment with the perforations 27 of the plate 26, such alignment being assumed as the parts are shown in Fig. 3, and hence being shown in Fig. 5; either to arrange the perforations 36 wholly out of registry with the perforations 27, to make the ventilating means inoperative whether the door 18 is open or closed, or to arrange the perforations 36 and 27 partially out of registry, to any extent desired, thereby to modify the ventilation all the while the door is closed.

At the right side of Fig. 2, and in Figs. 4 and 6, substantially the same ventilating arrangement as above described is shown at the upper portion of the wall 16.

Here the plate 37 corresponds to the plate 26, and is made exactly like the latter except that the reduced curved extension 38 from the front end of the plate 37, and corresponding to the extension 31 from the plate 26, is longer, for causing movement of the plate 37 when the door 18 is closed exactly as the plate 26 is then moved. The plate 37 is supported and guided in its sliding movements by pin and slot connections like those provided at 28—29 for the plate 26. Also, the plate 37 is acted on by a spring 39 operating as does the spring 30. Also, said plate 37 has perforations 40, see Fig. 6, corresponding in size, number and arrangement to the perforations 25, of the wall 16.

An auxiliary plate 41 is provided, this exactly like the plate 32; the plate 41 having an adjusting knob 42 and being supported and guided on the plate 37 by pin and slot connections like those provided at 33—34 for the plate 32, and having perforations 43 corresponding in size, number and arrangement with the perforations 40. Thus the plate 41 may also be manually adjusted to arrange its perforations 43 wholly in registry with, or wholly out of registration with, or variously partially in registration with, the perforations 40 of the plate 37, to modify the ventilating action of the ventilating means adjacent the wall 16; and either to the same adjustment as, or to a different adjustment from, that given the plate 32 of the ventilating means adjacent the wall 15.

As has already been explained, whenever the door 18 is opened, the springs 30 and 39 cause the plates 26 and 37 to have forward movements just sufficient to move the perforations 27 (Fig. 5) of the plate 26 wholly out of registry with the perforations 25' of the wall 15 and to move the perforations 40 (Fig. 6) of the plate 37 wholly out of registry with the perforations 25 of the wall 16.

Also, as already explained, on closing the door 18, the same engages the extensions 31 and 38 respectively carried by the plates 26 and 37, thus forcing these plates to slide inward (the spring 24' being strong enough to overcome both the springs 30 and 39), so as again to place the perforations of the plates 26 and 37 fully in registry with the perforations of the walls 15 and 16. As above stated in connection with the parts as shown in Fig. 3, the parts as shown in Fig. 4 are arranged as they would be with the door 18 closed.

The situation set up by said inward sliding movements of the plates 26 and 37 is illustrated in Figs. 5 and 6, it being noted that the ventilating means of Fig. 5 is open (this due to the fact that the plate 37, as indicated in Fig. 3 is presumed to have been previously manually adjusted on the plate 26 to wholly line up the perforations 36 and 27 of these two plates); while, even with the door closed, the ventilating means of Fig. 6 is wholly closed (this due to the fact that the plate 41, as indicated in Fig. 4, is presumed to have been previously manually adjusted on the plate 37, to wholly remove the perforations 43 from registration with the perforations 40).

As will be understood, either or both of the auxiliary plates 32 and 41 may be manually adjusted for maintaining their perforations partially in registration, to any desired extent, with the perforations of, respectively, the plates 26 and 37.

The bread box is shown as having a shelf 44, here shown as shaped to avoid interference with the ventilating means of Figs. 3 and 4 and yet to allow the shelf to be readily secured in place in the bread box. As best shown in Fig. 7, said shelf at each side thereof and at its front portion has offset extensions 45 terminating in downbent tabs 46, and said shelf has a rear downbent flange 57; by the aid of which flange and tabs, placed relative to the walls 14, 15 and 16 as indicated in Fig. 2, the shelf may be securely attached to said walls.

Having the plates 26 and 37 slidably controlled by opening and closing the door 18 provides an arrangement wherein the perforations 25 and 25' will be closed when the door 18 is open. The closing of the perforations 25 and 25' prevents cross drafts from being set up within the bread compartment 11 which would blow bread crumbs accumulated on the shelves of the bread compartment, out of the compartment onto the floor beneath the box. Yet, when the door is again closed sufficient ventilation will be provided for the interior of the bread compartment by the shifting of the plates 26 and 27 rearward against the action of the springs 30 and 39.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A household article comprising a combined bread box, a door mounted for movement to open and close the bread box, a ventilating means for the bread box comprising a wall thereof having a perforated area, means for closing said perforations, and means responsive to moving the door to closed position for disabling said closing means.

2. A household article comprising a combined bread box, a door mounted for movement to open and close the bread box, a ventilating means for the bread box comprising a wall thereof having a perforated area, means for closing said perforations, means responsive to moving the door to closed position for disabling said closing means, and yieldably acting means for rendering said closing means effective when the door is moved to open position.

3. A household article comprising a combined bread box, a door mounted for movement to open and close the bread box, a ventilating means for the bread box comprising a wall thereof having a perforated area, means for closing said perforations, and means responsive to moving the door to closed position for disabling said closing means, said ventilating means including auxiliary means manually adjustable to modify the ventilating action while the door is closed.

4. A household article comprising a combined bread box, a door mounted for movement to open and close the bread box, a ventilating means for the bread box comprising a wall thereof having a perforated area, means for closing said perforations, said closing means including a perforated plate movably mounted opposite said perforated area, means for normally urging said plate to a position to arrange its perforations out of registration with the perforations first-mentioned, and means responsive to a closing movement of the door for moving said plate to arrange its perforations overlappingly of the perforations first mentioned.

5. A household article comprising a combined bread box, a door mounted for movement to open and close the bread box, a ventilating means for the bread box comprising a wall thereof having a perforated area, means for closing said perforations, said closing means including a perforated plate movably mounted opposite said perforated area, means for normally urging said plate to a position to arrange its perforations out of registration with the perforations first-mentioned, means responsive to a closing movement of the door for moving said plate to arrange its perforations overlappingly of the perforations first-mentioned, and an auxiliary perforated plate movably mounted on the plate first-mentioned for adjustment on the latter to arrange the perforations of said plates either wholly out of registry or variously partially in registry.

EMANUEL KLEIN.

REFERENCES CITED

The following references are of record in the file of this patent:

UNITED STATES PATENTS

| Number | Name | Date |
|---|---|---|
| 389,906 | Rounds | Sept. 25, 1888 |
| 646,276 | Follweiler | Mar. 27, 1900 |
| 918,742 | Ferdon | Apr. 20, 1909 |
| 1,011,112 | Burlingame | Dec. 5, 1911 |